US009878595B2

(12) United States Patent
Miyakoshi et al.

(10) Patent No.: US 9,878,595 B2
(45) Date of Patent: Jan. 30, 2018

(54) CONTROL MEANS FOR THE COMPRESSOR OF A VEHICLE AIR CONDITIONER BASED ON TARGET HIGH PRESSURE

(71) Applicant: Sanden Holdings Corporation, Isesaki-shi, Gunma (JP)

(72) Inventors: Ryo Miyakoshi, Isesaki (JP); Kenichi Suzuki, Isesaki (JP); Kouhei Yamashita, Isesaki (JP)

(73) Assignee: Sanden Holdings Corporation, Isesaki-shi, Gunma (JP)

( * ) Notice: Subject to any disclaimer, the term of this patent is extended or adjusted under 35 U.S.C. 154(b) by 168 days.

(21) Appl. No.: 14/441,128

(22) PCT Filed: Nov. 11, 2013

(86) PCT No.: PCT/JP2013/080475
§ 371 (c)(1),
(2) Date: May 6, 2015

(87) PCT Pub. No.: WO2014/073690
PCT Pub. Date: May 15, 2014

(65) Prior Publication Data
US 2015/0298526 A1 Oct. 22, 2015

(30) Foreign Application Priority Data
Nov. 9, 2012 (JP) ................................. 2012-247531

(51) Int. Cl.
*F25B 13/00* (2006.01)
*F25D 17/00* (2006.01)
(Continued)

(52) U.S. Cl.
CPC ....... *B60H 1/3213* (2013.01); *B60H 1/00385* (2013.01); *B60H 1/00921* (2013.01);
(Continued)

(58) Field of Classification Search
CPC .............. B60H 1/3213; B60H 1/00921; B60H 1/00899; B60H 1/00385; B60H 1/00978;
(Continued)

(56) References Cited

U.S. PATENT DOCUMENTS 5,802,860 A * 9/1998 Barrows ................. F25B 41/04
62/126
9,517,680 B2 * 12/2016 Suzuki ............... B60H 1/00899
(Continued)

FOREIGN PATENT DOCUMENTS

| CN | 101657686 A | 2/2010 |
|----|-------------|--------|
| JP | 2008-185292 A | 8/2008 |

(Continued)

OTHER PUBLICATIONS

Japan Patent Office; Notification of Reasons for Refusal issued in Japanese Patent Application No. 2012-247531, dated Aug. 17, 2016.
(Continued)

*Primary Examiner* — Henry Crenshaw
(74) *Attorney, Agent, or Firm* — Baker Botts L.L.P.

(57) ABSTRACT

There is disclosed a vehicle air conditioner which can realize a desirable outlet temperature even when a refrigerant subcool degree of a radiator varies. A controller executes a heating mode to let a refrigerant discharged from a compressor 2 radiate heat in a radiator 4, decompress the refrigerant by which heat has been radiated, and then let the refrigerant absorb heat in an outdoor heat exchanger 7, thereby heating the vehicle interior. The controller controls the compressor 2 on the basis of a radiator target pressure, and corrects the radiator target pressure in such a direction as to heighten when a target subcool degree enlarges, on the basis of the target subcool degree (the refrigerant subcool degree) of the radiator 4.

11 Claims, 13 Drawing Sheets

(51) Int. Cl.
  *F25B 39/04* (2006.01)
  *F25B 41/04* (2006.01)
  *F25B 1/00* (2006.01)
  *B60H 1/32* (2006.01)
  *B60H 1/00* (2006.01)
  *F25B 49/02* (2006.01)

(52) U.S. Cl.
  CPC ....... *B60H 1/00978* (2013.01); *B60H 1/3207* (2013.01); *F25B 41/04* (2013.01); *F25B 49/027* (2013.01); *B60H 2001/00957* (2013.01)

(58) Field of Classification Search
  CPC ........ B60H 1/3207; B60H 2001/00957; B60H 2001/3248; B60H 2001/3251; B60H 2001/3279; F25B 2313/0291; F25B 2600/17
  See application file for complete search history.

(56) References Cited

U.S. PATENT DOCUMENTS

2005/0132731 A1\* 6/2005 Nakamura ........... B60H 1/3205
  62/160
2007/0125106 A1\* 6/2007 Ishikawa .............. B60H 1/3217
  62/183
2010/0281895 A1\* 11/2010 Okamoto ................ F24F 3/065
  62/160

FOREIGN PATENT DOCUMENTS

| JP | 2012-137281 | * | 7/2012 | |
| JP | 2012-137281 A | | 7/2012 | |
| JP | 2012-176659 A | | 9/2012 | |
| WO | 2012/118198 A1 | | 9/2012 | |
| WO | WO 2012118198 A1 * | | 9/2012 | ......... B60H 1/00899 |

OTHER PUBLICATIONS

The State Intellectual Property Office of the People's Republic of China; The First Office Action issued in Chinese Patent Application No. 201380058547.0, dated Jun. 29, 2016.
German Patent and Trade Mark Office, First Office Action issued in Application No. DE 11 2013 005 361.6, dated Jan. 5, 2017.
The State Intellectual Property Office of the People's Republic of China, Notice on the Second Office Action issued in Chinese Patent Application No. CN 201380058547.0, dated Apr. 6, 2017.
The State Intellectual Property Office of the People's Republic of China, The Third Office Action issued in Chinese Application No. 201380058547.0, dated Sep. 8, 2017.

\* cited by examiner

CONTROL MEANS FOR THE COMPRESSOR OF A VEHICLE AIR CONDITIONER BASED ON TARGET HIGH PRESSURE

CROSS-REFERENCE TO RELATED APPLICATIONS

This application is a U.S. National Stage Patent Application under 37 U.S.C. §371 of International Patent Application No. PCT/JP2013/080475, filed on Nov. 11, 2013, which claims the benefit of Japanese Patent Application No. JP 2012-247531, filed on Nov. 9, 2012, the disclosures of which are incorporated herein by reference in their entirety.

TECHNICAL FIELD

The present invention relates to an air conditioner of a heat pump system which conditions air in a vehicle interior, and more particularly, it relates to an air conditioner applicable to a hybrid car or an electric car.

BACKGROUND ART

Due to actualization of environmental problems in recent years, hybrid cars and electric cars have spread. Furthermore, an air conditioner which is applicable to such a vehicle, there has been developed an air conditioner which comprises a compressor to compress and discharge a refrigerant, a radiator disposed on a vehicle interior side to let the refrigerant radiate heat, a heat absorber disposed on the vehicle interior side to let the refrigerant absorb heat, and an outdoor heat exchanger disposed on a vehicle exterior side to let the refrigerant radiate or absorb heat, and which can change a heating operation in which the refrigerant discharged from the compressor radiates heat in the radiator and the refrigerant by which heat has been radiated in this radiator absorbs heat in the outdoor heat exchanger, a dehumidifying and heating operation in which the refrigerant, discharged from the compressor radiates heat in the radiator and the refrigerant by which heat has been radiated in the radiator absorbs heat only in the heat absorber or in this heat absorber and the outdoor heat exchanger, a cooling operation in which the refrigerant discharged from the compressor radiates heat in the outdoor heat exchanger and absorbs heat in the heat absorber, and a dehumidifying and cooling operation in which the refrigerant discharged from the compressor radiates heat in the radiator and the outdoor heat exchanger and absorbs heat in the heat absorber (e.g., see Patent Document 1).

CITATION LIST

Patent Documents

Patent Document 1: Japanese Patent Application Publication No. 2012-176659

SUMMARY OF THE INVENTION

Problems to be Solved by the Invention

Here, in accordance with a valve position of an outdoor expansion valve which decompresses a refrigerant flowing out from a radiator and flowing into an outdoor heat exchanger, the refrigerant is subcooled on an outlet side of the radiator. A refrigerant subcool degree SC in this case is regarded as a difference between a saturation temperature of the refrigerant in the radiator and a lowered temperature of the refrigerant in an outlet as shown in FIG. 10. It is to be noted that SH is a superheat degree of the refrigerant in an inlet, of the radiator.

In addition, when a revolution number of a compressor is constant, there are the characteristics that a temperature (a heating capability) of the radiator partially rises in a case where the refrigerant subcool degree SC of the radiator heightens as shown in FIG. 11 (Pd is a high pressure). However, when the refrigerant subcool degree of the radiator heightens, a dispersion is generated in the temperature depending on a part of the radiator (see FIG. 10), which causes the defect that comfort becomes worse, e.g., the defect that the temperature varies depending on an air outlet position into a vehicle.

To solve the problem, in this type of vehicle air conditioner, as shown in FIG. 12, a target value of the refrigerant subcool degree SC of the radiator has heretofore been set to be high for heating up on start up in a heating operation, so that priority is given to a performance. Afterward, when a vehicle interior temperature rises to a certain degree, control is executed and the target value of the refrigerant subcool degree SC is lowered to give priority to comfort.

For such a reason as described above, the refrigerant subcool degree in the radiator is changed. However, as shown in FIG. 13, the higher the refrigerant superheat degree SC of the radiator is, the lower an average temperature of the radiator becomes at the same high pressure Pd. That is, in a case where the refrigerant subcool degree SC is controlled in such a direction as to heighten, there has been the problem that to realize the same radiator temperature, a desirable outlet temperature cannot be obtained in the heating operation, when a target value of the high pressure Pd (the target high pressure) is not heightened.

The present invention has been developed to solve such a conventional technical problem, and an object thereof is to provide a vehicle air conditioner which can realize a desirable outlet temperature even when a refrigerant subcool degree of a radiator varies.

Means for Solving the Problems

A vehicle air conditioner of the invention of claim 1 comprises a compressor which compresses a refrigerant, an air flow passage through which air to be supplied into a vehicle interior flows, a radiator disposed in this air flow passage to let the refrigerant radiate heat, an outdoor heat exchanger disposed outside the vehicle, interior to let the refrigerant absorb heat, and control means, this control means being configured to let the refrigerant discharged from the compressor radiate heat in the radiator, decompresses the refrigerant by which heat has been radiated, and let the refrigerant absorb heat in the outdoor heat exchanger, thereby heating in the vehicle interior, the vehicle air conditioner being characterized in that the control means controls the compressor on the basis of a target high pressure, and corrects the target high pressure on the basis of a refrigerant subcool degree of the radiator.

A vehicle air conditioner of the invention of claim 2 comprises a compressor which compresses a refrigerant, an air flow passage through which air to be supplied into a vehicle interior flows, a radiator disposed in this air flow passage to let the refrigerant radiate heat, a heat absorber disposed in the air flow passage to let the refrigerant absorb heat, an outdoor heat exchanger disposed outside the vehicle interior to let the refrigerant radiate or absorb heat, an expansion valve which decompresses the refrigerant flowing into the outdoor heat exchanger, and control means, this control means being configured to change and execute at least one of a heating mode in which the refrigerant discharged from the compressor radiates heat in the radiator and the refrigerant by which heat has been radiated is decompressed and then absorbs heat in the outdoor heat exchanger, a dehumidifying and heating mode in which the refrigerant discharged from the compressor radiates heat in the radiator and the refrigerant by which heat has been radiated is decompressed and then absorbs heat only in the heat absorber or in the heat absorber and the outdoor heat exchanger, a dehumidifying and cooling mode in which the refrigerant discharged from the compressor radiates heat in the radiator and the outdoor heat exchanger and the refrigerant by which heat has been radiated is decompressed and then absorbs heat in the heat absorber, and a cooling mode in which the refrigerant discharged from the compressor radiates heat in the outdoor heat exchanger and the refrigerant by which heat has been radiated is decompressed and then absorbs heat in the heat absorber, the vehicle air conditioner being characterized in that in the heating mode, the control means controls a refrigerant subcool degree of the radiator by the expansion valve, also controls the compressor on the basis of a target high pressure, and corrects the target high pressure on the basis of the refrigerant subcool degree of the radiator.

The vehicle air conditioner of the invention of claim 3 is characterized in that in the above invention, the control means controls the refrigerant subcool degree of the radiator on the basis of at least one or any combination of indexes indicating a temperature of the air to be passed through the outdoor heat exchanger, a passing air volume of the radiator, a temperature of the air to be blown out into the vehicle interior, a temperature of the radiator, and an amount of the refrigerant to be circulated.

The vehicle air conditioner of the invention of claim 4 is characterized in that in the above respective inventions, the control means makes the correction so that the larger the refrigerant subcool degree of the radiator is, the higher the target high pressure becomes.

The vehicle air conditioner of the invention of claim 5 is characterized in that in the above respective inventions, the control means makes the correction so that the larger the passing air volume of the radiator is, the higher the target high pressure becomes.

The vehicle air conditioner of the invention of claim 6 is characterized in that in the invention of claim 4 or claim 5, the control means makes the correction so that the lower a velocity is, the higher the target high pressure becomes.

Advantageous Effect of the Invention

According to the inventions of claim 1 and claim 2, during heating in a vehicle interior, control means controls a compressor on the basis of a target high pressure, and corrects the target high pressure on the basis of a refrigerant subcool degree of a radiator which is controlled by an expansion valve and the like. Therefore, for regulation of a performance, for example, as in the invention of claim 3, the control means controls the refrigerant subcool degree of the radiator on the basis of at least one or any combination of indexes indicating a temperature of the air to be passed through an outdoor heat exchanger, a passing air volume of the radiator, a temperature of the air to be blown out into the vehicle interior, a temperature of the radiator, and an amount of a refrigerant to be circulated. Also at this time, the target high pressure is corrected on the basis of this refrigerant subcool degree, and hence a necessary temperature of the radiator can be acquired.

In consequence, it is possible to acquire a desirable heating capability by the radiator for the heating in the vehicle interior and to realize comfortable air condition in the vehicle interior by heat radiation from the radiator.

In this case, when as in the invention of claim 4, the control means makes the correction so that the larger the refrigerant subcool degree of the radiator is, the higher the target high pressure becomes, the temperature of the radiator which disadvantageously lowers by enlargement of the refrigerant subcool degree of the radiator can effectively be complemented by heightening the target high pressure.

In addition, when as in the invention of claim 5, the control means makes the correction so that the larger the passing air volume of the radiator is, the higher the target high pressure becomes, it is possible to effectively complement a feeling temperature or a temperature efficiency which lowers with an increase of an outlet air volume and to realize the comfortable air condition in the vehicle interior.

Furthermore, when as in the invention of claim 6, the control means makes the correction so that the lower a velocity is, the higher the target high pressure becomes, it is possible to effectively complement deterioration of a heat absorption capability of the outdoor heat exchanger with a drop of the velocity and to always realize the comfortable air condition in the vehicle interior regardless of a change of the velocity.

MODE FOR CARRYING OUT THE INVENTION

Hereinafter, an embodiment of the present invention will be described in detail with reference to the drawings.

Figure 1:
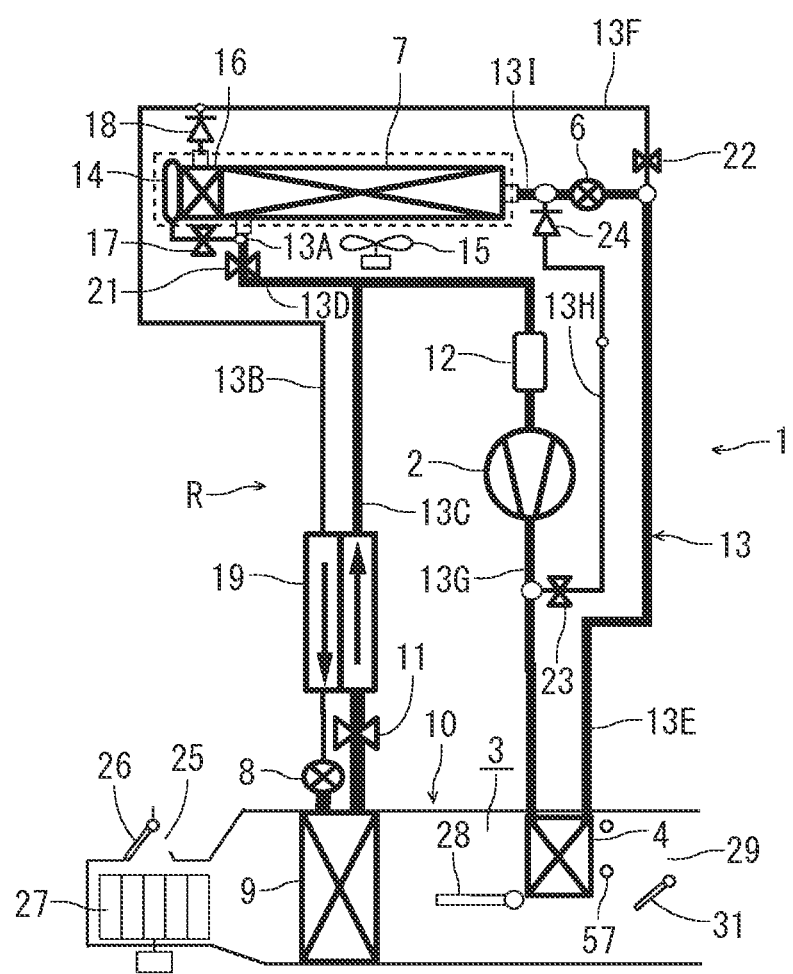
FIG. 1 is a constitutional view of a vehicle air conditioner of one embodiment to which the present invention is applied.

FIG. 1 shows a constitutional view of a vehicle air conditioner 1 of one embodiment of the present invention. In this case, a vehicle of the embodiment to which the present invention is applied is an electric car (EV) which does not have an engine (an internal combustion engine), and runs by driving an electric motor for running by a power charged in a battery (which is not shown), and the vehicle air conditioner 1 of the present invention is driven by the power of the battery.

That is, in the electric car in which heating cannot be performed by waste heat of the engine, the vehicle air conditioner 1 of the embodiment performs the heating by a heat pump operation in which a refrigerant circuit is used, and further selectively executes respective operation modes of dehumidifying and heating, cooling and dehumidifying, cooling, and the like. It is to be noted that the vehicle is not limited to the electric car, and the present invention is also effective for a so-called hybrid car in which the engine is used together with the electric motor for the running, and is further applicable also to a usual car which runs by the engine.

The vehicle air conditioner 1 of the embodiment performs air conditioning (heating, cooling, dehumidifying, and ventilation) in the electric car, and there are successively connected, by a refrigerant pipe 13, an electric compressor 2 which compresses a refrigerant to raise a pressure, a radiator 4 disposed in an air flow passage 3 of an HVAC unit 10 in which air in the vehicle interior is passed and circulated, to let the high-temperature high-pressure refrigerant discharged from the compressor 2 radiate heat in the vehicle interior, an outdoor expansion valve 6 constituted of an electric valve which decompresses and expands the refrigerant during the heating, an outdoor heat exchanger 7 which performs heat exchange between the refrigerant and outdoor air to function as the radiator during the cooling and function as an evaporator during the heating, an indoor expansion valve 8 constituted of an electric valve which decompresses and expands the refrigerant, a heat absorber 9 disposed in the air flow passage 3 to let the refrigerant absorb heat from interior and exterior of the vehicle during the cooling and during the dehumidifying and heating, an evaporation capability control valve 11 which regulates an evaporation capability in the heat absorber 9, an accumulator 12 and the like, so that a refrigerant circuit R is constituted. It is to be noted that in the outdoor heat exchanger 7, an outdoor blower 15 is disposed to perform the heat exchange between the outdoor air and the refrigerant when the vehicle is stopped.

In addition, the outdoor heat exchanger 7 has a header portion 14 and a subcooling portion 16 successively on a refrigerant downstream side, a refrigerant pipe 13A extended out from the outdoor heat exchanger 7 is connected to the header portion 14 via a solenoid valve (an opening/closing valve) 17 opened during the cooling, and an outlet of the subcooling portion 16 is connected to the indoor expansion valve 8 via a check valve 18. It, is to be noted that the header portion 14 and the subcooling portion 16 structurally constitute a part of the outdoor heat exchanger 7, and an indoor expansion valve 8 side of the check valve 18 is a forward direction.

In addition, a refrigerant pipe 13B between the check valve 18 and the indoor expansion valve 8 is disposed in a heat exchange relation with a refrigerant pipe 13C extended out from the evaporation capability control valve 11 positioned on an outlet side of the heat absorber 9, and both the pipes constitute an internal heat exchanger 19. In consequence, the refrigerant flowing through the refrigerant pipe 13B into the indoor expansion valve 8 is cooled (subcooled) by the low-temperature refrigerant flowing out from the heat absorber 9 through the evaporation capability control valve 11.

In addition, the refrigerant pipe 13A extended out from the outdoor heat exchanger 7 is branched, and this branched refrigerant pipe 13D communicates to be connected to the refrigerant pipe 13C on the downstream side of the internal heat exchanger 19 via a solenoid valve (an opening/closing valve) 21 to be opened during heating. Furthermore, a refrigerant pipe 13E on an outlet side of the radiator 4 is branched before the outdoor expansion valve 6, and this branched refrigerant pipe 13F communicates to be connected to the refrigerant pipe 13B on the downstream side of the check valve 18 via a solenoid valve an opening/closing valve) 22 to be opened during the dehumidifying.

In addition, a refrigerant pipe 13G on a discharge side of the compressor 2 is branched, and this branched refrigerant pipe 13H communicates to be connected to a refrigerant pipe 13I between the outdoor expansion valve 6 and the outdoor heat exchanger 7 via a solenoid valve (an opening/closing valve) 23 which is opened during defrosting of the outdoor heat exchanger 7 to allow the high-temperature refrigerant (a hot gas) discharged from the compressor 2 to flow directly into the outdoor heat exchanger 7 and a check valve 24. It is to be rioted that a direction of the refrigerant pipe 13I of the check valve 24 is the forward direction.

Additionally, in the air flow passage 3 on an air upstream side of the heat absorber 9, respective suction ports (represented by a suction port 25 in FIG. 1), e.g., an indoor air suction port and an outdoor air suction port are formed, and in the suction port 25, a suction changing damper 26 is disposed to change the air to be introduced into the air flow passage 3 between indoor air which is air in the vehicle interior (an indoor air circulating mode) and outdoor air which is air outside the vehicle interior (an outdoor air introducing mode). Further, on an air downstream side of the suction changing damper 26, an indoor blower (a blower fan) 27 is disposed to supply the introduced indoor air or outdoor air to the air flow passage 3.

Additionally, in the air flow passage 3 on the air upstream side of the radiator 4, an air mix damper 28 is disposed to regulate a degree of flow of the indoor air or the outdoor air through the radiator 4. Further, in the air flow passage 3 on an air downstream side of the radiator 4, each outlet of foot, vent or defroster (represented by an outlet 29 in FIG. 1) is formed, and in the outlet 29, an outlet changing damper 31 is disposed to perform changing control of blowing of the air from each outlet mentioned above.

Figure 2:
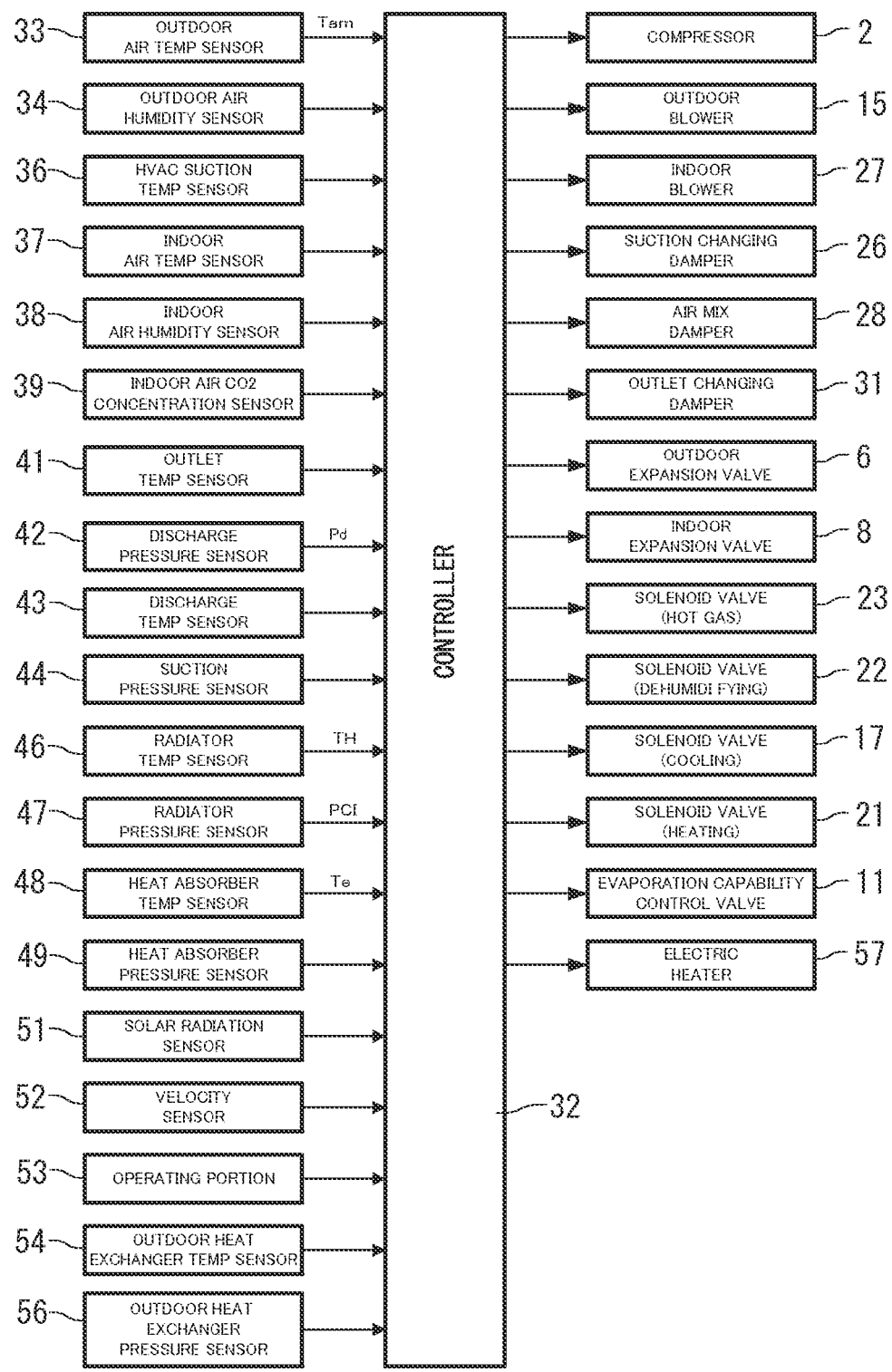
FIG. 2 is a block diagram of an electric circuit of a controller of the vehicle air conditioner of FIG. 1.

Next, in FIG. 2, 32 is a controller (ECU) as control means constituted of a microcomputer, and an input of the controller 32 is connected to respective outputs of an outdoor air temperature sensor 33 which detects an outdoor air temperature of the vehicle, an outdoor air humidity sensor 34 which detects an outdoor air humidity, an HVAC suction temperature sensor 36 which detects a suction temperature from the suction port 25 to the air flow passage 3, an indoor air temperature sensor 37 which detects a temperature of the air in the vehicle interior (the indoor air), an indoor air humidity sensor 38 which detects a humidity of the air in the vehicle interior, an indoor air $CO_2$ concentration sensor 39 which detects a carbon dioxide concentration in the vehicle interior, an outlet temperature sensor 41 which detects a temperature of the air blown out from the outlet 29 into the vehicle interior, a discharge pressure sensor 42 which detects a pressure of the refrigerant discharged from the compressor 2, a discharge temperature sensor 43 which detects a temperature of the refrigerant discharged from the compressor 2, a suction pressure sensor 44 which detects a suction refrigerant pressure of the compressor 2, a radiator temperature sensor 46 which detects a temperature of the radiator 4 (the temperature of the radiator 4 itself or the temperature of the air heated in the radiator 4), a radiator pressure sensor 47 which detects a refrigerant pressure of the radiator 4 (the pressure in the radiator 4 or the pressure of the refrigerant flowing out from the radiator 4), a heat absorber temperature sensor 48 which detects a temperature of the heat absorber 9 (the temperature of the heat absorber 9 itself or the air cooled in the heat absorber 9), a heat absorber pressure sensor 49 which detects a refrigerant pressure of the heat absorber 9 (the pressure in the heat absorber 9 or the pressure of the refrigerant flowing out from the heat absorber 9), a solar radiation sensor 51 of, e.g., a photo sensor system to detect a solar radiation amount into the vehicle, a velocity sensor 52 to detect a moving speed of the vehicle (a velocity), an operating portion 53 to set the changing of the temperature or the operation mode, an outdoor heat exchanger temperature sensor 54 which detects a temperature of the outdoor heat exchanger 7, and an outdoor heat exchanger pressure sensor 56 which detects the refrigerant pressure of the outdoor heat exchanger 7.

An output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves 23, 22, 17 and 21, and the evaporation capability control valve 11. In addition, the output of the controller 32 is also connected to an electric heater 57 disposed in the air flow passage 3 on the air downstream side of the radiator 4 to complement the heating by the radiator 4, and the controller 32 controls these components on the basis of the outputs of the respective sensors and the setting input by the operating portion 53.

Next, an operation of the vehicle air conditioner 1 of the embodiment having the abovementioned constitution will be described. In the embodiment, the controller 32 changes and executes respective roughly divided operation modes such as a heating mode, a dehumidifying and heating mode, an internal cycle mode, a dehumidifying and cooling mode, and a cooling mode. First, the flow of the refrigerant in each operation mode will be described.

(1) Heating Mode

When the heating mode is selected by the controller 32 or a manual operation to the operating portion 53, the controller 32 opens the solenoid valve 21 and closes the solenoid valve 17, the solenoid valve 22 and the solenoid valve 23. Furthermore, the compressor 2 and the respective blowers 15 and 27 are operated, and the air mix damper 28 has a state where the air blown out from the indoor blower 27 is passed through the radiator 4. In consequence, the high-temperature high-pressure gas refrigerant discharged from the compressor 2 flows into the radiator 4. The air in the air flow passage 3 is passed through the radiator 4, and hence the air in the air flow passage 3 is heated by the high-temperature refrigerant, in the radiator 4, whereas the refrigerant in the radiator 4 has the heat taken by the air and is cooled to condense and liquefy.

The refrigerant liquefied in the radiator 4 flows through the refrigerant pipe 13E to reach the outdoor expansion valve 6 which decompresses the refrigerant, and then the refrigerant flows into the outdoor heat exchanger 7. The refrigerant flowing into the outdoor heat exchanger 7 evaporates, and the heat is pumped up from the outdoor air passed by running or the outdoor blower 15 (a heat pump). Furthermore, the low-temperature refrigerant flowing out from the outdoor heat exchanger 7 flows through the refrigerant pipe 13D and the solenoid valve 21 to flow from the refrigerant pipe 13C into the accumulator 12 in which gas liquid separation is performed, and then the gas refrigerant is sucked into the compressor 2, thereby repeating this circulation. The air heated in the radiator 4 is blown out from the outlet 29, and hence the heating in the vehicle interior is performed.

The controller 32 controls a revolution number of the compressor 2 on the basis of a high pressure of the refrigerant circuit R which is detected by the discharge pressure sensor 42 or the radiator pressure sensor 47, also controls a valve position of the outdoor expansion valve 6 on the basis of the temperature of the radiator 4 which is detected by the radiator temperature sensor 46 and the refrigerant pressure of the radiator 4 which is detected by the radiator pressure sensor 47, and controls a subcool degree of the refrigerant in the outlet of the radiator 4.

(2) Dehumidifying and Heating Mode

Next, in the dehumidifying and heating mode, the controller 32 opens the solenoid valve 22 in the above state of the heating mode. In consequence, a part of the condensed refrigerant, flowing through the radiator 4 and the refrigerant, pipe 13E is distributed, and flows through the solenoid valve 22 to flow from the refrigerant pipes 13F and 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by a heat absorbing operation at this time, and hence the air is cooled and dehumidified.

The refrigerant evaporated in the heat absorber 9 flows through the evaporation capability control valve 11 and the internal heat exchanger 19 to loin the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, and hence the dehumidifying and heating in the vehicle interior are performed.

The controller 32 controls the revolution number of the compressor 2 on the basis of the high pressure of the refrigerant circuit R which is detected by the discharge pressure sensor 42 or the radiator pressure sensor 47, and also controls the valve position of the outdoor expansion valve 6 on the basis of the temperature of the heat absorber 9 which is detected by the heat absorber temperature sensor 48.

(3) Internal Cycle Mode

Next, in the internal cycle mode, the controller 32 shuts off the outdoor expansion valve 6 in the above state of the dehumidifying and heating mode (a shut off position) and also closes the solenoid valve 21. When the outdoor expansion valve 6 and the solenoid valve 21 are closed, inflow of the refrigerant into the outdoor heat exchanger 7 and outflow of the refrigerant from the outdoor heat exchanger 7 are inhibited, so that all the condensed refrigerant flowing through the radiator 4 and the refrigerant pipe 13E flows through the solenoid valve 22 and the refrigerant pipe 13F. Furthermore, the refrigerant flowing through the refrigerant pipe 13F flows from the refrigerant pipe 13B through the internal heat exchanger 19 to reach the indoor expansion valve 8. The refrigerant is decompressed in the indoor expansion valve it and then flows into the heat absorber 9 to evaporate. Water in the air blown out from the indoor blower 27 coagulates to adhere to the heat absorber 9 by the heat absorbing operation at this time, and hence the air is cooled and, dehumidified.

The refrigerant evaporated in the heat absorber 9 flows through the evaporation capability control valve 11, the internal heat exchanger 19, the refrigerant pipe 13C and the accumulator 12 to be sucked into the compressor 2, thereby repeating this circulation. The air dehumidified in the heat absorber 9 is reheated in the process of passing the radiator 4, and hence the dehumidifying and heating in the vehicle interior are performed. However, in this internal cycle mode, the refrigerant is circulated between the radiator 4 (heat radiation) and the heat absorber 9 (heat absorption) which are present in the air flow passage 3 on an indoor side, and hence the heat is not pumped up from the outdoor air, but a heating capability for consumed power of the compressor 2 is exerted. The whole amount of the refrigerant flows through the heat absorber 9 which exerts a dehumidifying operation, and hence as compared with the above dehumidifying and heating mode, a dehumidifying capability is high, but the heating capability lowers.

The controller 32 controls the revolution number of the compressor 2 on the basis of the temperature of the heat absorber 9 or the abovementioned high pressure of the refrigerant circuit R. At this time, the controller 32 selects a smaller compressor target number of revolution from compressor target numbers of revolution obtained by calculations from the temperature of the heat absorber 9 or the high pressure, to control the compressor 2 as described later.

(4) Dehumidifying and Cooling Mode

Next, in the dehumidifying and cooling mode, the controller 32 opens the solenoid valve 17 and closes the solenoid valve 21, the solenoid valve 22 and the solenoid valve 23. Furthermore, the compressor 2 and the respective blowers 15 and 27 are operated, and the air mix damper 28 has the state where the air blown out from the indoor blower 27 is passed through the radiator 4. In consequence, the high-temperature high-pressure gas refrigerant discharged from the compressor 2 flows into the radiator 4. Through the radiator 4, the air in the air flow passage 3 is passed, and hence the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled so that the valve tends to be open, to flow into the outdoor heat exchanger 7. The refrigerant flowing into the outdoor heat exchanger 7 is cooled by the running therein or the outdoor air passed by the outdoor blower 15, to condense. The refrigerant flowing out from the outdoor heat exchanger 7 flows from the refrigerant pipe 13A through the solenoid valve 17 to successively flow into the header portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant, evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is lower than that during the heating), and hence the dehumidifying and cooling in the vehicle interior are performed.

The controller 32 controls the revolution number of the compressor 2 on the basis of the temperature of the heat absorber 9 which is detected by the heat absorber temperature sensor 48, also controls the valve position of the outdoor expansion valve 6 on the basis of the abovementioned high pressure of the refrigerant circuit R, and controls a refrigerant pressure (an after-mentioned radiator pressure PCI) of the radiator 4.

(5) Cooling Mode

Next, in the cooling mode, the controller 32 fully opens the outdoor expansion valve 6 in the above state of the dehumidifying and cooling mode (sets the valve position to an upper limit, of controlling), and the air mix damper 28 has a state where the air is not passed through the radiator 4. In consequence, the high-temperature high-pressure gas refrigerant discharged from the compressor 2 flows into the radiator 4. The air in the air flow passage 3 is not passed through the radiator 4, the air therefore only passes here, and the refrigerant flowing out from the radiator 4 flows through the refrigerant pipe 13E to reach the outdoor expansion valve 6.

At this time, the outdoor expansion valve 6 is fully opened and hence the refrigerant flows into the outdoor heat exchanger 7 as it is, in which the refrigerant is cooled by the running therein or the outdoor air passed through the outdoor blower 15, to condensate and liquefy. The refrigerant flowing out from the outdoor heat exchanger 7 flows from the refrigerant pipe 13A through the solenoid valve 17 to successively flow into the header portion 14 and the subcooling portion 16. Here, the refrigerant, is subcooled.

The refrigerant flowing out from the subcooling portion 16 of the outdoor heat, exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, so that the air is cooled.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4 but is blown out from the outlet 29 into the vehicle interior, and hence cooling in the vehicle interior is performed.

Figure 3:
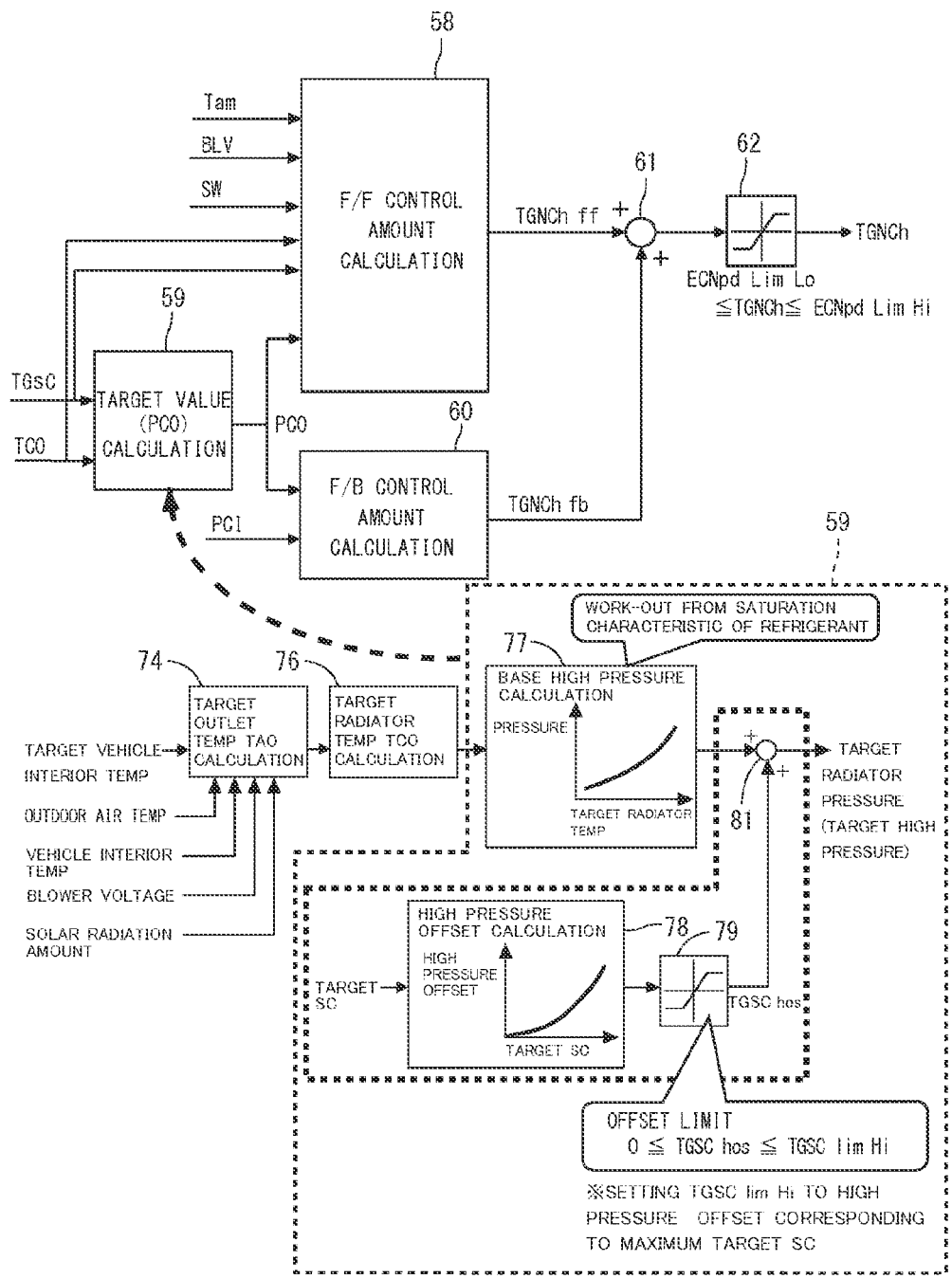
FIG. 3 is a control block diagram concerning compressor control including correcting control of a radiator target pressure (a target high pressure) by the controller of FIG. 2.
Figure 4:
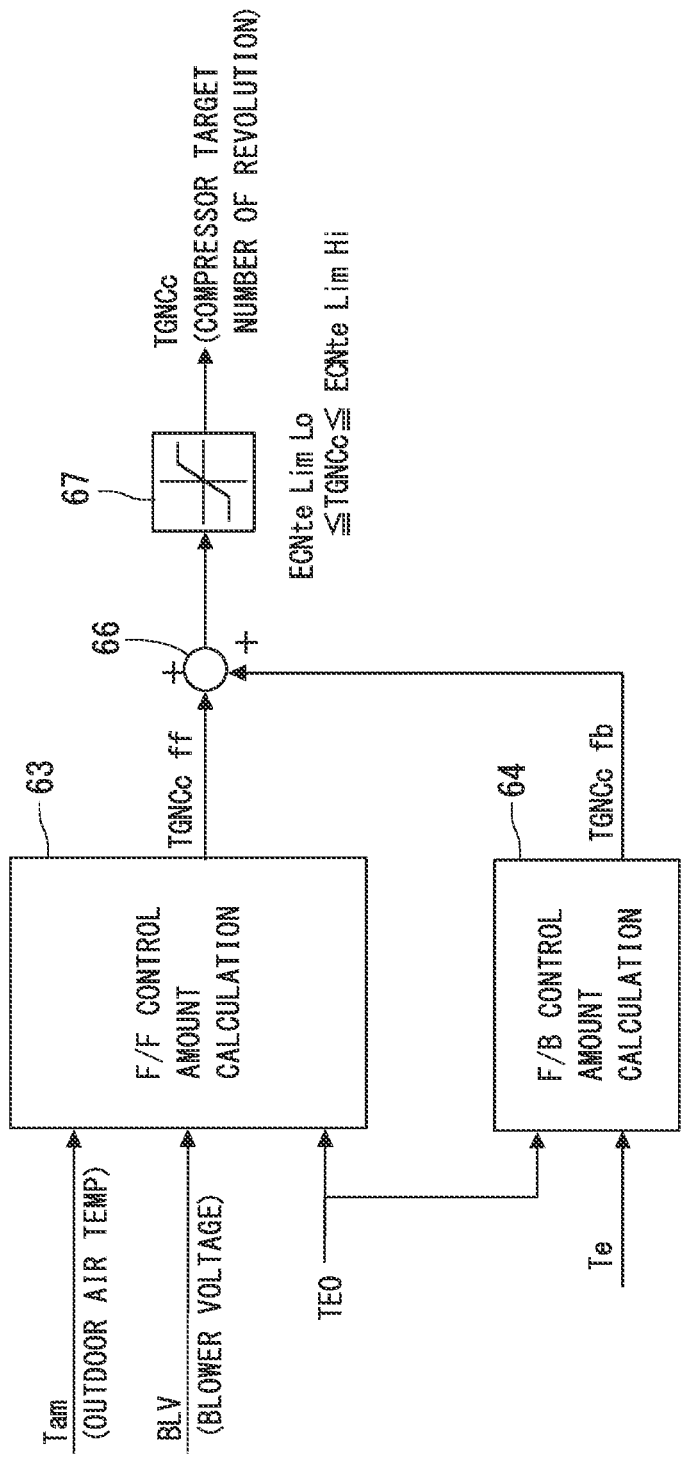
FIG. 4 is another control block diagram concerning the compressor control of the controller of FIG. 2.
Figure 5:
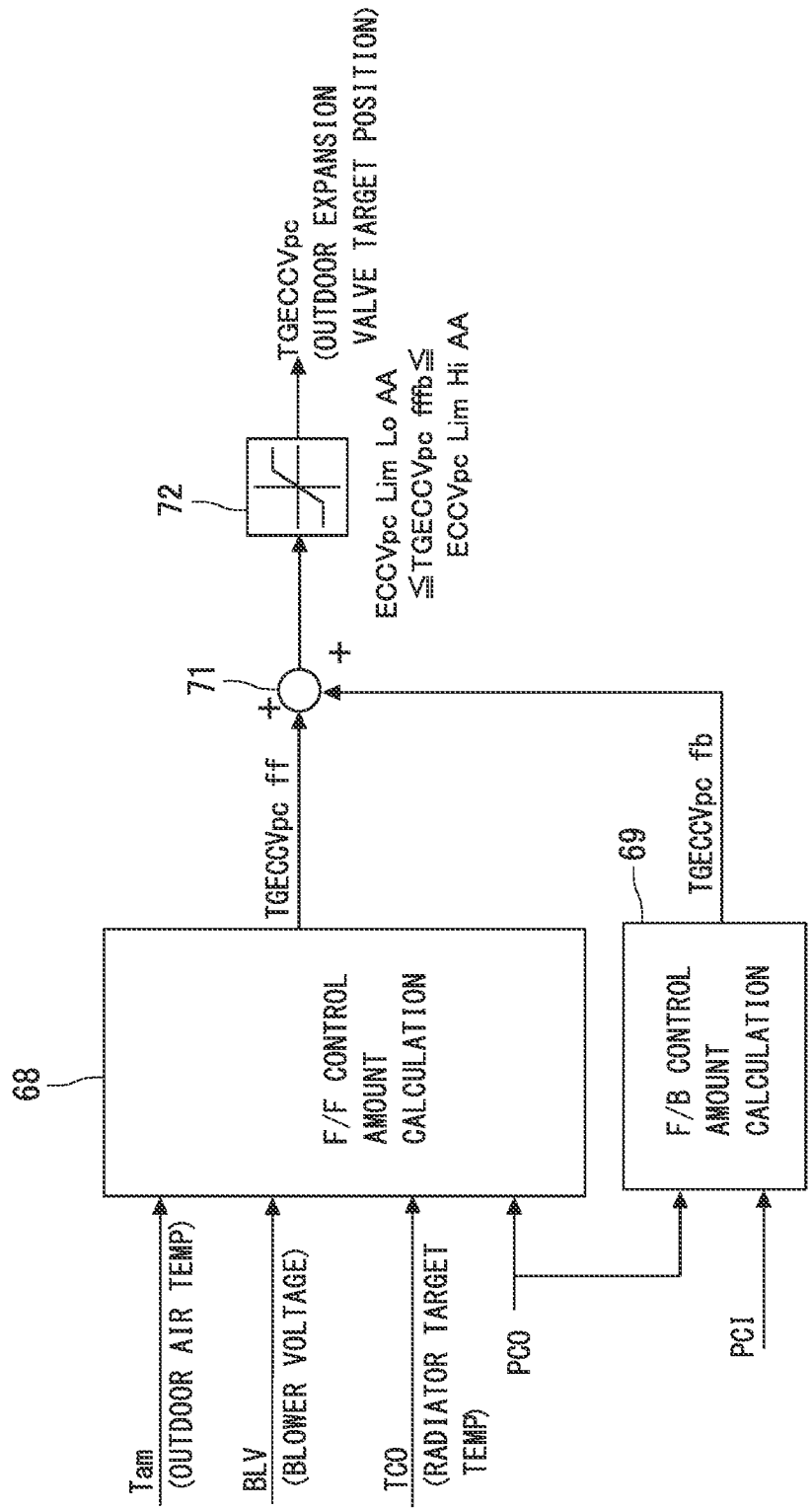
FIG. 5 is a control block diagram concerning outdoor expansion valve control of the controller of FIG. 2.

In this cooling mode, the controller 32 controls the revolution number of the compressor 2 on the basis of temperature of the heat absorber 9 which is detected by the heat absorber temperature sensor 48. Next, FIG. 3 to FIG. 5 show control block diagrams of the compressor 2 and the outdoor expansion valve 6 by the controller 32 in the abovementioned respective operation modes. FIG. 3 is the control block diagram of the controller 32 which determines a target number of revolution (a compressor target number of revolution) TGNCh of the compressor 2 for the above heating mode and the above dehumidifying and heating mode. An F/F (feedforward) control amount calculation section 58 of the controller 32 calculates an F/F control amount TGNChff of the compressor target number of revolution on the basis of an outdoor air temperature Tam obtained from the outdoor air temperature sensor 33, a blower voltage BLV of the indoor blower 27, an air mix damper opening SW of the air mix damper 28 which is obtained in accordance with SW=(TAO−Te)/(TH−Te), a target subcool degree TGSC which is a target value of a refrigerant subcool degree SC in the outlet of the radiator 4, a radiator target temperature TCO which is a target value of the temperature of the radiator 4, and a radiator target pressure PCO (a target high pressure in the present invention) which is a target value of the pressure of the radiator 4.

It is to be noted that TAO is a target outlet temperature which is a target value of an air temperature from the outlet 29, TH is the temperature of the radiator 4 which is obtained from the radiator temperature sensor 46 (the radiator temperature), and Te is the temperature of the heat absorber 9 which is obtained from the heat absorber temperature sensor 48 (the heat absorber temperature). The air mix damper opening SW varies in a range of 0≤SW≤1, 0 indicates an air mix shut off state where the air is not passed through the radiator 4, and 1 indicates an air mix fully opened state where all the air in the air flow passage 3 is passed through the radiator 4.

The above radiator target pressure PCO is calculated on the basis of the above target subcool degree TGSC and the radiator target temperature TCO by a target value calculation section 59. Furthermore, an F/B (feedback) control amount calculation section 60 calculates an F/B control amount TGNChfb of the compressor target number of revolution on the basis of this radiator target pressure PCO and the radiator pressure PCI which is the refrigerant, pressure of the radiator 4. Furthermore, the F/F control amount TGNCnff calculated by the F/F control amount calculation section 58 and the control amount TGNChfb calculated by the F/B control amount calculation section 60 are added by an adder 61, limits of an upper limit of controlling and a lower limit of controlling are attached by a limit setting section 62, and then the compressor target number of revolution TGNCh is determined. In the above heating mode and the dehumidifying and heating mode, the controller 32 controls the revolution number of the compressor 2 on the basis of this compressor target number of revolution TGNCh.

Consequently, in the heating mode, the dehumidifying and heating mode or a mode in which the radiator 4 performs heat radiation, thereby heating in the vehicle interior as in the after-mentioned internal cycle mode, the compressor target number of revolution TGNCh of the compressor 2 is determined on the basis of the radiator target pressure PCO (the target high pressure), but in the present invention, the target value calculation section 59 mentioned above corrects the radiator target pressure PCO on the basis of the target subcool degree TGSC. This will be described later in detail.

On the other hand, FIG. 4 is the control block diagram of the controller 32 which determines a target number of revolution (a compressor target number of revolution) TGNCc of the compressor 2 for the above cooling mode and the dehumidifying and cooling mode. An F/F control amount calculation section 63 of the controller 32 calculates an F/F control amount TGNCcff of the compressor target number of revolution on the basis of the outdoor air temperature Tam, the blower voltage BLV, and a heat absorber target temperature TEO which is a target value of the temperature of the heat absorber 9.

In addition, an F/B control amount calculation section 64 calculates an F/B control amount TGNCcfb of the compressor target number of revolution on the basis of the heat absorber target temperature TEO and the heat absorber temperature Te. Furthermore, the F/F control amount TGNCcff calculated by the F/F control amount calculation section 63 and the F/B control amount TGNCcfb calculated by the F/B control amount calculation section 64 are added by an adder 66, limits of an upper limit of controlling and a lower limit of controlling are attached by a limit setting section 67, and then the compressor target number of revolution TGNCc is determined. In the cooling mode and the dehumidifying and cooling mode, the controller 32 controls the revolution number of the compressor 2 on the basis of this compressor target number of revolution TGNCc.

It is to be noted that in the above internal cycle mode, the controller 32 controls the revolution number of the compressor 2 by use of a smaller control amount in the compressor target number of revolution TGNCh calculated for the heating mode and the dehumidifying and heating mode and the compressor target number of revolution TGNCc calculated for the cooling mode and the dehumidifying and cooling mode as described above.

Next, FIG. 5 is the control block diagram of the controller 32 which determines a target position (an outdoor expansion valve target position) TGECCVpc of the outdoor expansion valve 6 in the dehumidifying and cooling mode. An F/F control amount calculation section 68 of the controller 32 calculates an F/F control amount TGECCVpcff of the outdoor expansion valve target position on the basis of the outdoor air temperature Tam, the blower voltage BLV, the radiator target temperature TCO, and the radiator target pressure PCO.

In addition, an F/B control amount calculation section 69 calculates an F/B control amount TGECCVpcfb of the outdoor expansion valve target position on the basis of the radiator target pressure PCO and the radiator pressure PCI. Furthermore, the F/F control amount TGECCVpcff calculated by the F/F control amount calculation section 68 and the F/B control amount TGECCVpcfb calculated by the F/B control amount calculation section 69 are added by an adder 71, limits of an upper limit of controlling and a lower limit of controlling are attached by a limit setting section 72, and then the outdoor expansion valve target position TGECCVpc is determined. In the dehumidifying and cooling mode, the controller 32 controls the valve position of the outdoor expansion valve 6 on the basis of this outdoor expansion valve target position TGECCVpc.

The air flowing through the air flow passage 3 is subjected to the cooling from the heat absorber 9 and a heating operation from the radiator 4 (regulated by the air mix damper 28) in the above respective operation modes, to be blown out into the vehicle interior from the outlet 29. The controller 32 calculates the target outlet temperature TAO on the basis of the outdoor air temperature Tam detected by the outdoor air temperature sensor 33, the interior temperature which is detected by the indoor air temperature sensor 37, the above blower voltage, the solar radiation amount detected by the solar radiation sensor 51, and the like, and the target interior temperature (the set temperature) in the vehicle which is set by the operating portion 53, and each operation mode is changed to control the temperature of the air blown out from the outlet 29 into this target outlet temperature TAO as described later.

(6) Changing Control of Operation Mode

Figure 6:
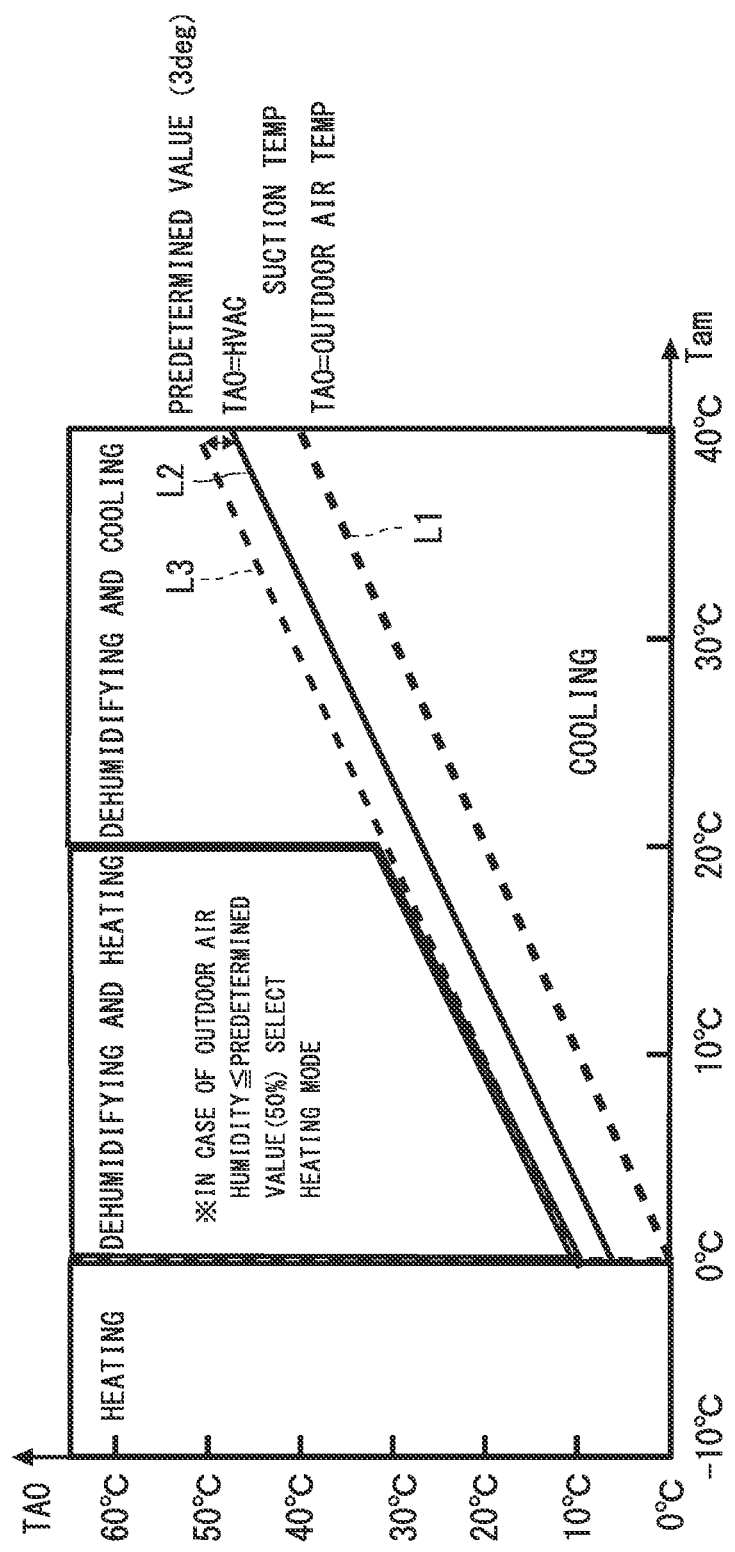
FIG. 6 is a diagram to explain changing control of an operation mode of the controller of FIG. 2.

Next, the changing control of the above respective operation modes by the controller 32 will be described with reference to FIG. 6. The controller 32 selects the operation mode on startup as shown in FIG. 6. That is, in this embodiment, the controller 32 selects the operation mode on the basis of the outdoor air temperature Tam detected by the outdoor air temperature sensor 33 and the target outlet temperature TAO. In FIG. 6, a broken line L1 is a line of the target outlet temperature TAO=the outdoor air temperature Tam, and a solid line L2 is a line of the target outlet temperature TAO=HVAC suction temperature (the temperature of the air sucked from the suction port 25 to the air flow passage 3). In addition, a broken line L3 is a line of hysteresis set on a predetermined value (three degrees) above the solid line.

When the outdoor air temperature Tam of FIG. 6 is 0° C. or less, the controller 32 selects the heating mode. In addition, when the outdoor air temperature Tam is higher than 0° C. and the target outlet temperature TAO is the HVAC suction temperature or less, the controller selects the cooling mode. Furthermore, when the outdoor air temperature Tam is higher than 0° C. and is a predetermined value (e.g., 20° C. or the like) or less and when the target outlet temperature TAO is higher than the HVAC suction temperature, the controller selects the dehumidifying and heating mode, and further, when the outdoor air temperature Tam is higher than the predetermined value, the controller selects the dehumidifying and cooling mode. It is to be noted that when the outdoor air humidity detected by the outdoor air humidity sensor 34 is a predetermined value (e.g., 50% or the like) or less on conditions for the selection of the dehumidifying and heating mode, the controller selects the heating mode.

Furthermore, after the start, the respective operation modes in FIG. 6 are selected and changed in accordance with changes of an environment or setting conditions, e.g., the above outdoor air temperature Tam and the target outlet temperature TAO. In this case, the controller 32 basically shifts from the heating mode to the dehumidifying and heating mode, or from the dehumidifying and heating mode to the heating mode, or from the dehumidifying and heating mode to the dehumidifying and cooling mode, or from the dehumidifying and cooling mode to the dehumidifying and heating mode, and shifts from the dehumidifying and cooling mode to the cooling mode, or from the cooling mode to the dehumidifying and cooling mode. However, when the controller shifts from the dehumidifying and heating mode to the dehumidifying and cooling mode and shifts from the dehumidifying and cooling mode to the dehumidifying and heating mode, the controller shifts via the above internal cycle mode. In addition, the controller shifts from the cooling mode to the internal cycle mode and from the internal cycle to the cooling mode sometimes.

(7) Determination of Target Subcool Degree

Figure 7:
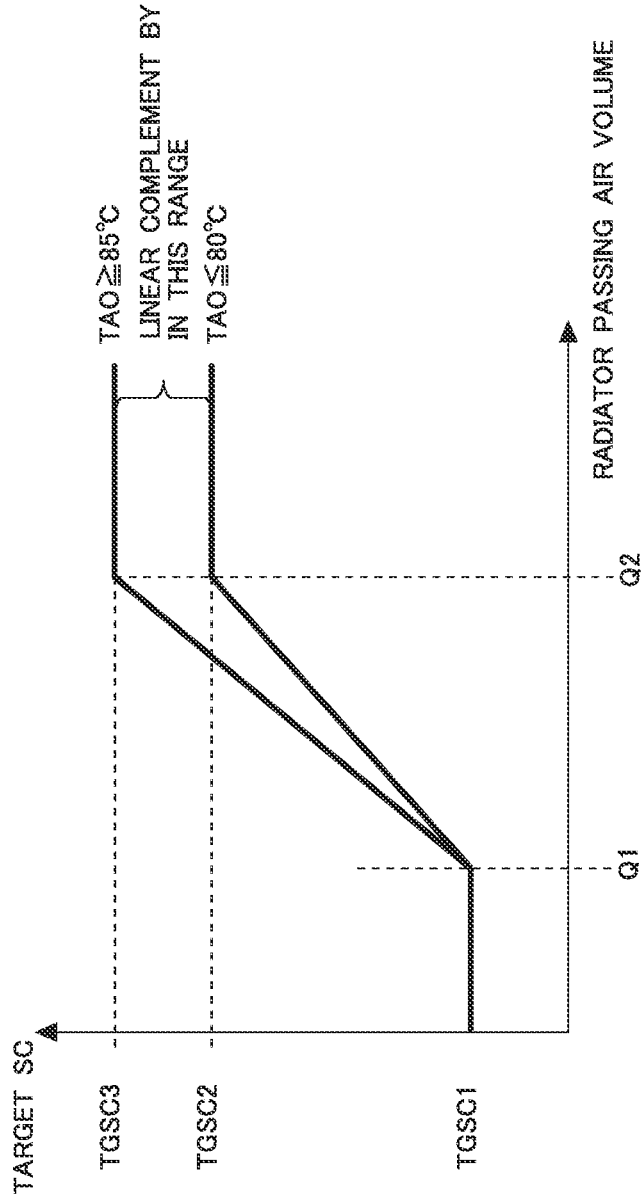
FIG. 7 is a diagram to explain determining control of a target subcool degree of a radiator by the controller of FIG. 2.

Next, the controller 32 sets and changes the target subcool degree TGSC as shown in FIG. 7. In this drawing, the abscissa indicates a passing air volume of the radiator 4 and the ordinate indicates the target subcool degree TGSC of the radiator 4. When the passing air volume is Q1, the controller 32 sets the target subcool degree TGSC to a lower value TGSC1. In addition, when the passing air volume increases to Q2 and when the target outlet temperature TAO at this time is a first predetermined value (e.g., 80° C.) or less, the target subcool degree TGSC is raised to TGSC2 which is higher than TGSC1, and when the target outlet temperature TAO is a second predetermined value (e.g., 85° C.) or more which is higher than the above predetermined value, the target subcool degree TGSC is changed to rise to TGSC3 which is further higher than TGSC2. It is to be noted that linear interpolation by the target outlet temperature TAO is performed between the first predetermined value and the second predetermined value.

It is to be noted that in the embodiment of FIG. 7, the target subcool degree TGSC is determined on the basis of the passing air volume of the radiator 4 and the target outlet temperature TAO, but the present invention is not limited to the embodiment, and the target subcool degree may be determined on the basis of one or any combination of indexes indicating a temperature of the air (the outdoor air) to be passed through the outdoor heat exchanger 7, a temperature Th of the radiator 4, and the amount of the refrigerant to be circulated in the refrigerant circuit R, e.g., the revolution number of the compressor 2, and any combination of them and the passing air volume of the radiator 4 and the target outlet temperature TAO.

(8-1) Correction of Radiator Target Pressure (Target High Pressure) by Target Subcool Degree (No. 1)

Next, there will be described correcting control of the radiator target pressure PCO (the target high pressure) based on the target subcool degree TGSC of the radiator 4 by the controller 32. A part shown by a broken line on the downside of FIG. 3 shows a control block of calculation performed in the target value calculation section 59. The target value calculation section 59 of the controller 32 corrects the radiator target pressure PCO (the target high pressure) on the basis of the target subcool degree TGSC determined as described above. It is to be noted that the target high pressure in the present invention may be a target value of a discharged refrigerant pressure of the compressor 2.

First, 74 in FIG. 3 is a target outlet temperature calculation section of the controller 32, and the target outlet temperature calculation section 74 calculates the target outlet temperature TAO on the basis of the outdoor air temperature Tam, the temperature in the vehicle interior, the blower voltage, the solar radiation amount and the like, and a target interior temperature (a set temperature) in the vehicle interior as described above. This target outlet temperature TAO is input into a target radiator temperature calculation section 76 of the controller 32. The target radiator temperature calculation section 76 calculates the radiator target temperature TCO, and this radiator target temperature TCO is next input into a base high pressure calculation section 77 of the target value calculation section 59. The base high pressure calculation section 77 calculates a base value of the radiator target pressure from saturation characteristics of the refrigerant on the basis of the radiator target temperature TCO.

On the other hand, the abovementioned target subcool degree TGSC is input into a high pressure offset calculation section 78 of the target value calculation section 59. The high pressure offset calculation section 78 calculates a high pressure offset in such a direction as to enlarge when the target subcool degree TGSC enlarges. A limit setting section 79 attaches limits of an upper limit of controlling and a lower limit, of controlling to this high pressure offset, and then a high pressure offset TGSChos is determined. It is to be noted that the upper limit in the limit setting section 79 is an offset corresponding to the maximum target subcool degree TGSC. Furthermore, this high pressure offset TGSChos is added to the abovementioned base value of the radiator target pressure in an adder 81 and is input as the radiator target pressure PCO (the target high pressure) into the F/F control amount calculation section 58 and the F/B control amount calculation section 60 mentioned above.

Consequently, in the present invention, the controller 32 corrects the radiator target pressure PCO (the target high pressure) on the basis of the target subcool degree TGSC (the refrigerant subcool degree) of the radiator 4 in the heating mode (the high pressure offset TGSChos), and hence the necessary temperature of the radiator 4 can be acquired. In consequence, it is possible to acquire a required heating capability by the radiator 4 for the heating in the vehicle interior and to realize comfortable air condition in the vehicle interior by the heat radiation from the radiator 4.

In this case, the controller 32 makes the correction so that the larger the target subcool degree TGSC (the refrigerant subcool degree) of the radiator 4 is, the higher the radiator target pressure PCO (the target high pressure) becomes, and hence the temperature of the radiator 4 which disadvantageously lowers by enlargement of the refrigerant subcool degree SC of the radiator 4 can effectively be complemented by heightening the radiator target pressure PCO (the target high pressure).

(8-2) Correction of Radiator Target Pressure (Target High Pressure) by Target Subcool Degree (No. 2)

Figure 8:
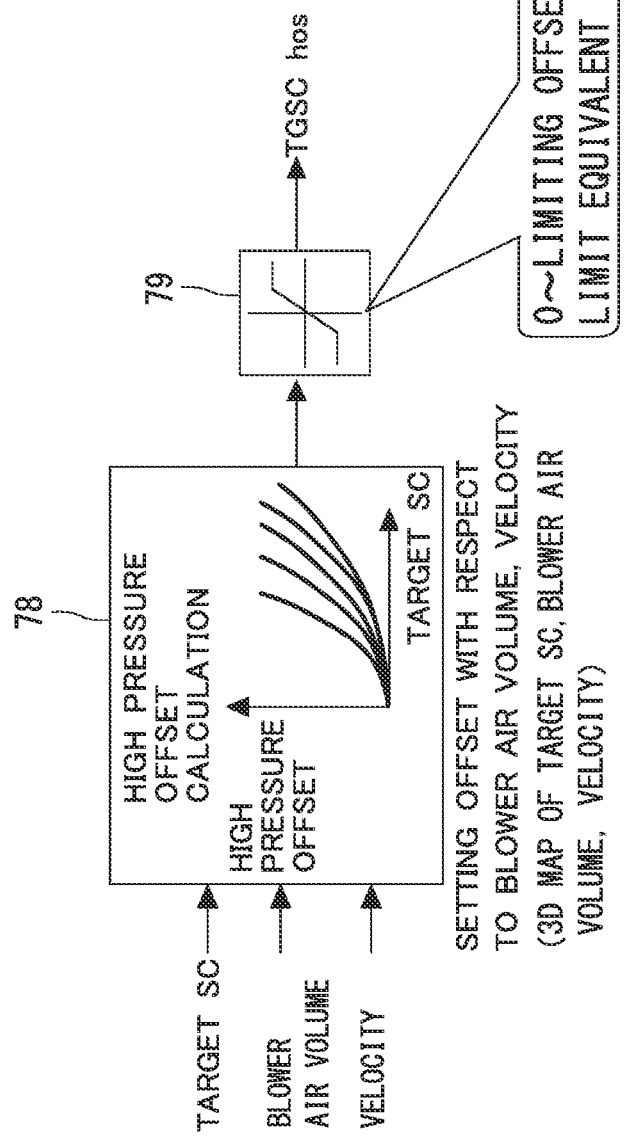
FIG. 8 is another control block diagram to explain another correcting control of the radiator target pressure (the target high pressure) by the controller of FIG. 2.

Next, FIG. 8 shows another control example concerning correction of the radiator target pressure PCO by the target subcool degree TGSC. In this drawing, portions denoted with the same reference symbols as in FIG. 3 perform the same or similar functions. In this case, in addition to the target subcool degree TGSC, a blower air volume and a velocity obtained from the velocity sensor 52 are input into the high pressure offset calculation section 78 of the target value calculation section 59. Furthermore, in addition to the correction by the target subcool degree TGSC, the high pressure offset TGSChos is further corrected in a direction where a blower air volume increases and the larger the passing air volume of the radiator 4 is, the larger the high pressure offset TGSChos becomes, or in a direction where the lower the velocity is, the larger the high pressure offset TGSChos becomes.

Here, when the blower air volume increases, the passing air volume of the radiator 4 also increases, and hence it is felt that an outlet temperature lowers. Therefore, the high pressure offset TGSChos is further corrected in a direction where the larger the blower air volume is, the larger the high pressure offset. TGSChos becomes, and hence it is possible to effectively complement the drop of the feeling temperature and to realize the comfortable air condition in the vehicle interior.

In addition, when the velocity is low, the heat absorption in the outdoor heat exchanger 7 also decreases. Therefore, the high pressure offset TGSChos is further corrected in a direction where the lower the velocity is, the larger the high pressure offset TGSChos becomes, and hence it is possible to effectively complement deterioration of a heat absorption capability of the outdoor heat exchanger 7 due to the drop of the velocity and to always realize the comfortable air condition in the vehicle interior regardless of the change of the velocity.

(8-3) Correction of Radiator Target Pressure (Target High Pressure) by Target Subcool Degree (No. 3)

Figure 9:
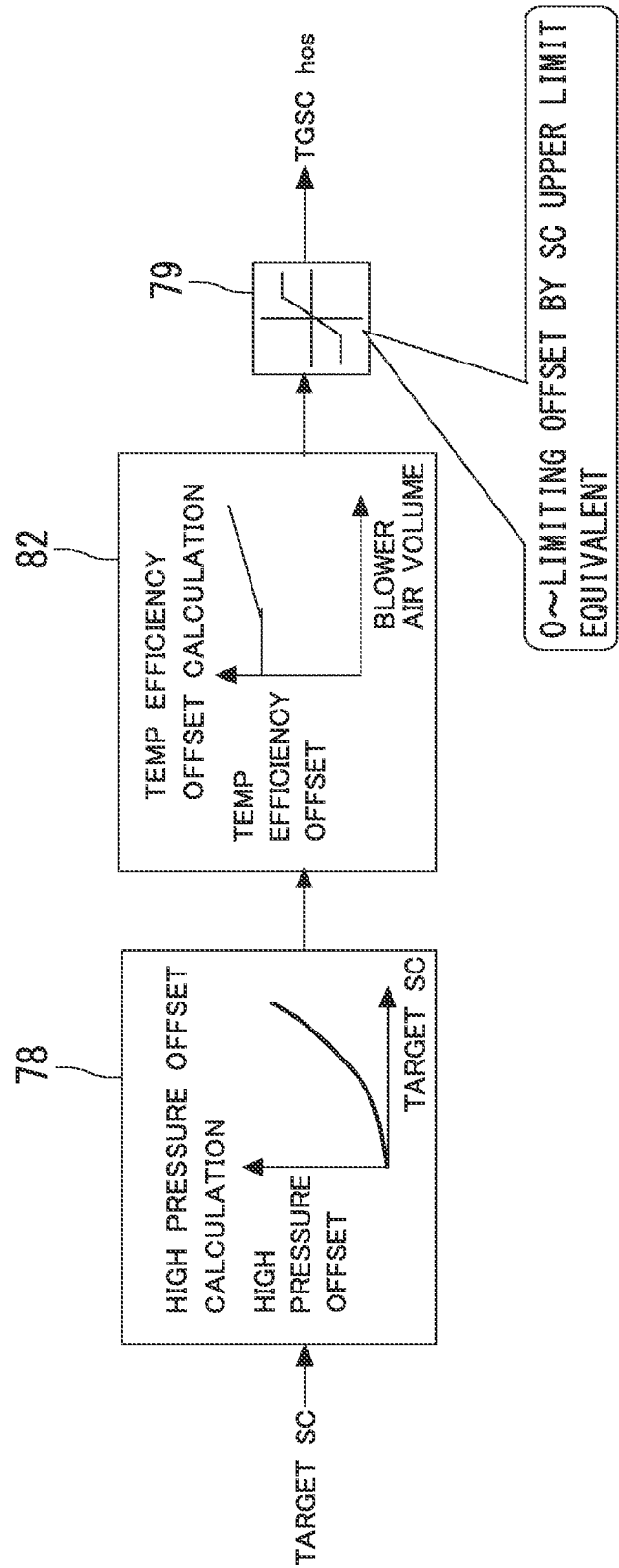
FIG. 9 is a control block diagram to explain still another correcting control of the radiator target pressure (the target high pressure) by the controller of FIG. 2.
Figure 10:
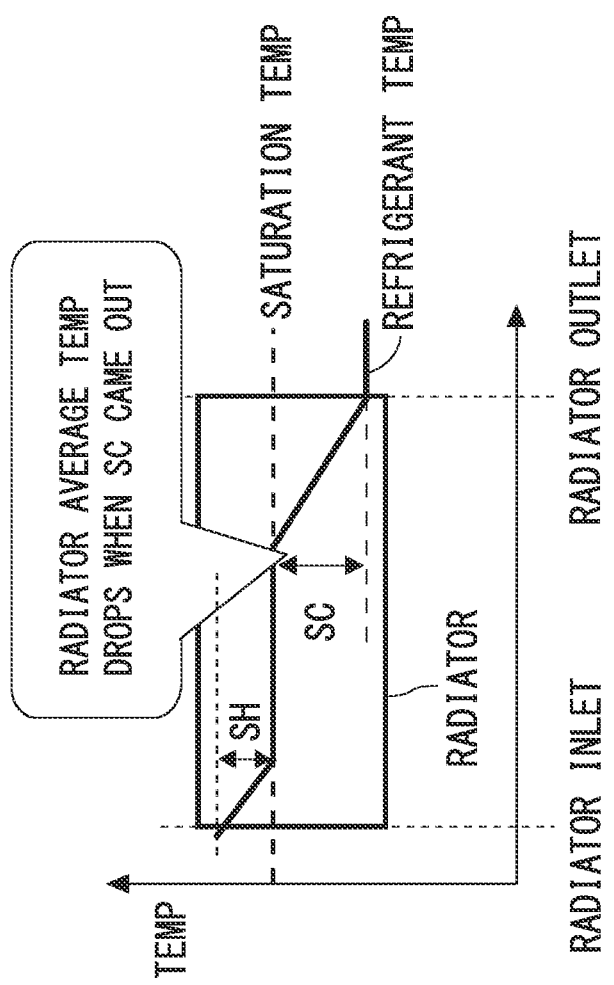
FIG. 10 is a diagram to explain a refrigerant subcool degree in the radiator.
Figure 11:
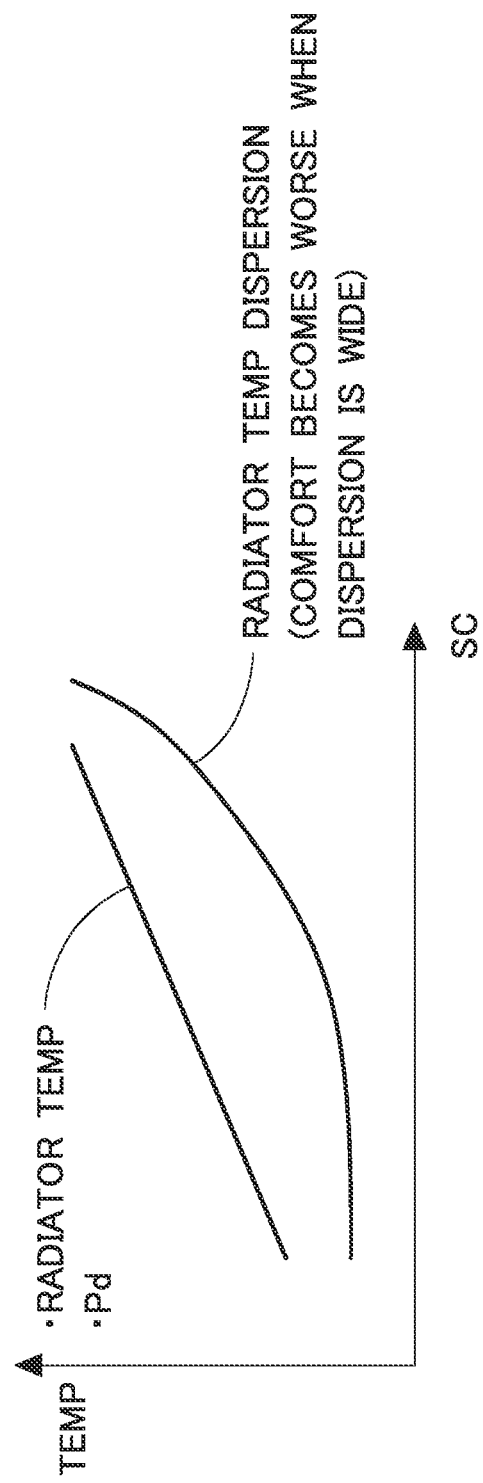
FIG. 11 is a diagram showing a relation between the refrigerant subcool degree of the radiator and a radiator temperature.
Figure 12:
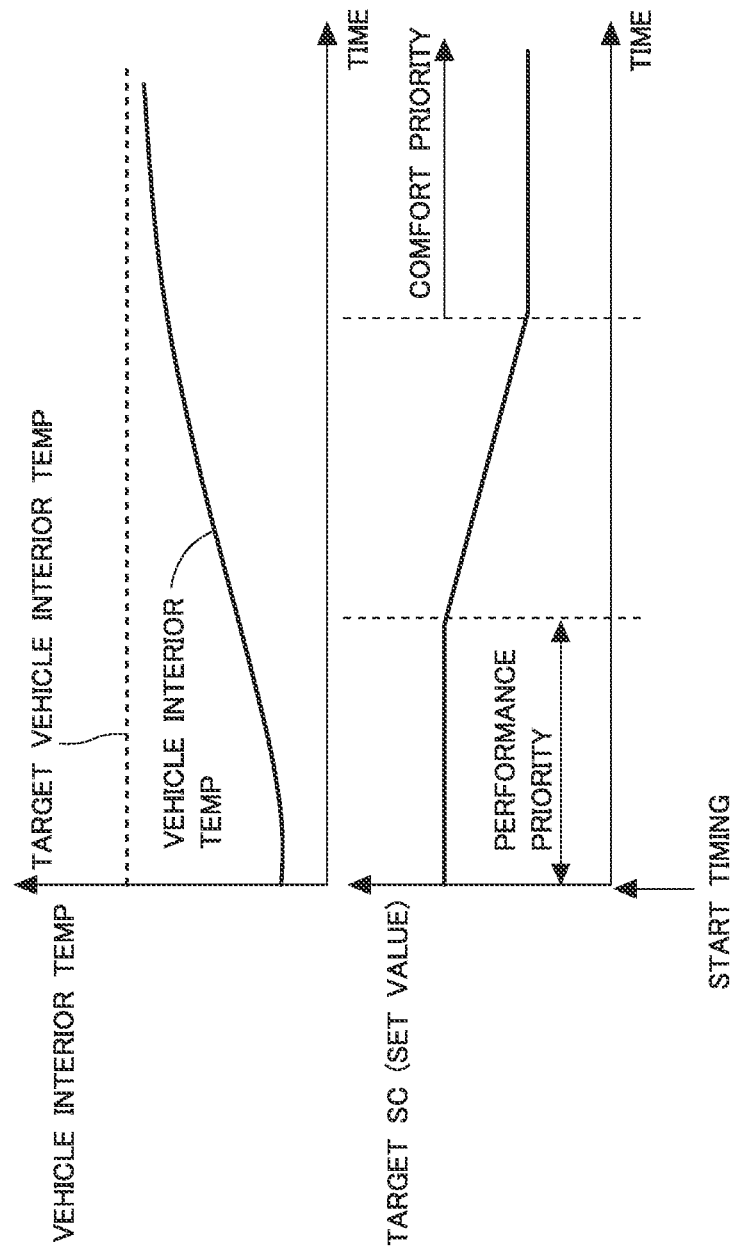
FIG. 12 is a diagram explaining a behavior to change a target value of the refrigerant subcool degree of the radiator.
Figure 13:
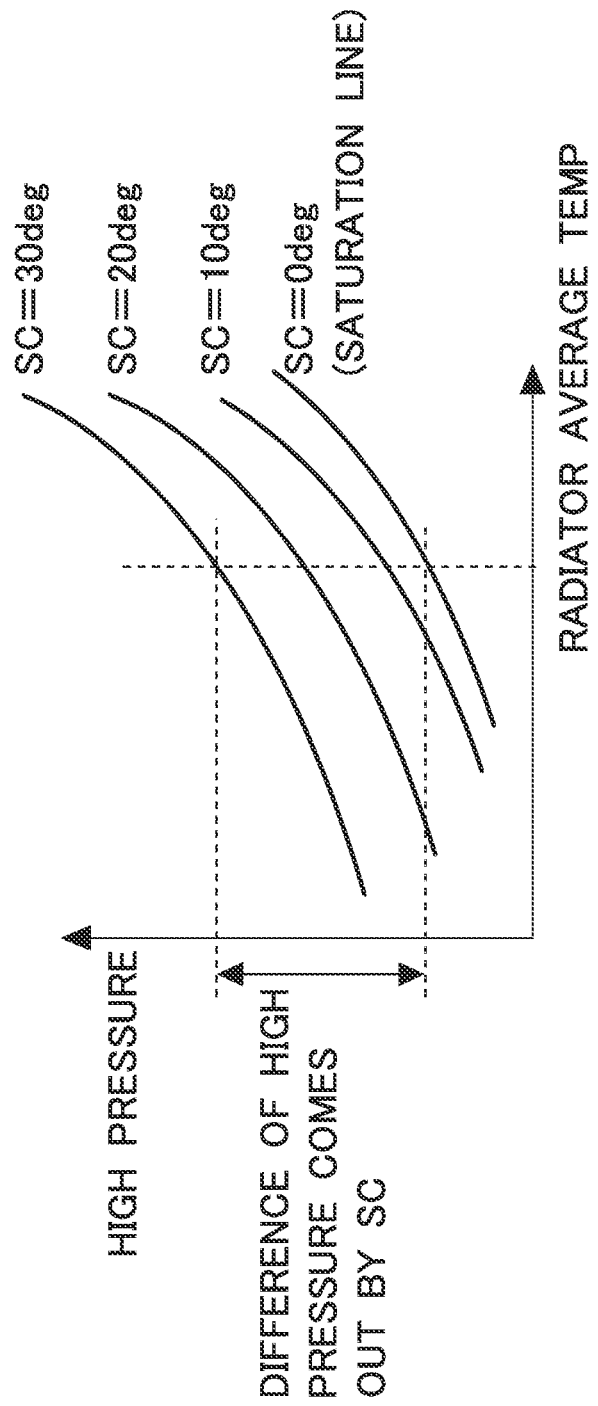
FIG. 13 is a diagram showing a relation between an average temperature and a high pressure of the radiator when the refrigerant subcool degree of the radiator is changed.

Next, FIG. 9 shows another control example concerning the correction of the radiator target pressure PCO by the target subcool degree TGSC. In this drawing, portions denoted with the same reference symbols as in FIG. 3 perform the same functions. In this case, a temperature efficiency offset calculation section 82 is interposed in a high stage of the high pressure offset calculation section 78 of the target value calculation section 59. The temperature efficiency offset calculation section 82 enlarges a temperature efficiency offset so that the more a blower air volume increases, the larger the high pressure offset TGSChos becomes.

When the blower air volume increases to increase the passing air volume through the radiator 4, a heat exchange efficiency in the radiator 4 deteriorates. Therefore, when the blower air volume increases to enlarge the passing air volume of the radiator 4, the temperature efficiency offset is enlarged, and the high pressure offset TGSChos is further corrected in a direction where the high pressure offset TGSChos further enlarges. Consequently, it is possible to effectively complement the deterioration of the temperature efficiency and to realize the comfortable air condition in the vehicle interior.

It is to be noted that in the above embodiment, the present invention is applied to the vehicle air conditioner which changes and executes the respective operation modes of the dehumidifying and heating, the internal cycle, the dehumidifying and cooling and the cooling, in addition to the heating mode, but the invention of claim 1 is not limited to the embodiment, and the present invention is also effective for a vehicle air conditioner which only executes the heating mode. In addition, needless to say, the constitution and respective numeric values of the refrigerant circuit R described in the above embodiment are not limited, and are changeable without departing from the gist of the present invention.

DESCRIPTION OF REFERENCE NUMERALS 1 vehicle air conditioner
2 compressor
3 air flow passage
4 radiator
6 outdoor expansion valve
7 outdoor heat exchanger
8 indoor expansion valve
9 heat absorber
11 evaporation capability control valve
17, 21, 22 and 23 solenoid valve
26 suction changing damper
27 indoor blower (a blower fan)
28 air mix damper
32 controller (control means)
57 electric heater
R refrigerant circuit

The invention claimed is:

1. A vehicle air conditioner comprising:
a compressor which compresses a refrigerant;
an air flow passage through which air to be supplied into a vehicle interior flows;
a radiator disposed in the air flow passage to let the refrigerant radiate heat;
an outdoor heat exchanger disposed outside the vehicle interior to let the refrigerant absorb heat; and
control means,
the control means being configured to let the refrigerant discharged from the compressor radiate heat in the radiator, decompress the refrigerant by which heat has been radiated and then let the refrigerant absorb heat in the outdoor heat exchanger, thereby heating in the vehicle interior, wherein the control means controls the compressor on the basis of a target high pressure, and corrects the target high pressure on the basis of a refrigerant subcool degree of the radiator, wherein the control means makes a correction so that the larger the refrigerant subcool degree of the radiator is, the higher the target high pressure becomes, and wherein the control means makes the correction so that as the vehicle velocity decreases, the target high pressure increases.

2. A vehicle air conditioner comprising:

a compressor which compresses a refrigerant;

an air flow passage through which air to be supplied into a vehicle interior flows;

a radiator disposed in the air flow passage to let the refrigerant radiate heat;

a heat absorber disposed in the air flow passage to let the refrigerant absorb heat;

an outdoor heat exchanger disposed outside the vehicle interior to let the refrigerant radiate or absorb heat;

an expansion valve which decompresses the refrigerant flowing into the outdoor heat exchanger; and control means, the control means being configured to change and selectively execute the following modes:

a heating mode in which the refrigerant discharged from the compressor radiates heat in the radiator, and the refrigerant by which heat has been radiated is decompressed and then absorbs heat in the outdoor heat exchanger;

a dehumidifying and cooling mode in which the refrigerant discharged from the compressor radiates heat in the radiator and the outdoor heat exchanger, and the refrigerant by which heat has been radiated is decompressed and then absorbs heat in the heat absorber; and a cooling mode in which the refrigerant discharged from the compressor radiates heat in the outdoor heat exchanger, and the refrigerant by which heat has been radiated is decompressed and then absorbs heat in the heat absorber, wherein in the heating mode, the control means controls a refrigerant subcool degree of the radiator by the expansion valve, controls the compressor on the basis of a target high pressure, and corrects the target high pressure on the basis of the refrigerant subcool degree of the radiator, wherein the control means makes a correction so that the larger the refrigerant subcool degree of the radiator is, the higher the target high pressure becomes, and wherein the control means makes the correction so that as the vehicle velocity decreases, the target high pressure increases.

3. The vehicle air conditioner according to claim 1, wherein the control means controls the refrigerant subcool degree of the radiator on the basis of at least one or any combination of indexes indicating a temperature of the air to be passed through the outdoor heat exchanger, a passing air volume of the radiator, a temperature of the air to be blown out into the vehicle interior, a temperature of the radiator, and an amount of the refrigerant to be circulated.

4. The vehicle air conditioner according to claim 1, wherein the control means makes the correction so that as the passing air volume of the radiator increases, the higher the target high pressure increases.

5. The vehicle air conditioner according to claim 1, wherein the refrigerant subcool degree comprises a difference between a saturation temperature of the refrigerant in the radiator and a lowered temperature of the refrigerant in an outlet of the radiator.

6. The vehicle air conditioner according to claim 2, wherein the refrigerant subcool degree comprises a difference between a saturation temperature of the refrigerant in the radiator and a lowered temperature of the refrigerant in an outlet of the radiator.

7. A vehicle air conditioner comprising:

a compressor which compresses a refrigerant;

an air flow passage through which air to be supplied into a vehicle interior flows;

a radiator disposed in the air flow passage to let the refrigerant radiate heat;

a heat absorber disposed in the air flow passage to let the refrigerant absorb heat;

an outdoor heat exchanger disposed outside the vehicle interior to let the refrigerant radiate or absorb heat;

an expansion valve which decompresses the refrigerant flowing into the outdoor heat exchanger;

control means being configured to execute a heating mode in which the refrigerant discharged from the compressor radiates heat in the radiator, and the refrigerant by which heat has been radiated is decompressed and then absorbs heat in the outdoor heat exchanger; and wherein in the heating mode, the control means controls a refrigerant subcool degree of the radiator by the expansion valve, controls the compressor on the basis of a target high pressure, and corrects the target high pressure on the basis of the refrigerant subcool degree of the radiator, wherein the control means makes a correction so that the larger the refrigerant subcool degree of the radiator is, the higher the target high pressure becomes, and wherein the control means makes the correction so that as the vehicle velocity decreases, the target high pressure increases.

8. The vehicle air conditioner according to claim 7, wherein the refrigerant subcool degree comprises a difference between a saturation temperature of the refrigerant in the radiator and a lowered temperature of the refrigerant in an outlet of the radiator.

9. The vehicle air conditioner according to claim 8, wherein the control means is further configured to selectively execute between the heating mode and a dehumidifying and cooling mode in which the refrigerant discharged from the compressor radiates heat in the radiator and the outdoor heat exchanger, and the refrigerant by which heat has been radiated is decompressed and then absorbs heat in the heat absorber.

10. The vehicle air conditioner according to claim 8, wherein the control means is further configured to selectively execute between the heating mode and a cooling mode in which the refrigerant discharged from the compressor radiates heat in the outdoor heat exchanger, and the refrigerant by which heat has been radiated is decompressed and then absorbs heat in the heat absorber.

11. The vehicle air conditioner according to claim 10, wherein the control means is further configured to selectively execute among the heating mode, and a dehumidifying and cooling mode and a cooling mode in which the refrigerant discharged from the compressor radiates heat in the outdoor heat exchanger, and the refrigerant by which heat has been radiated is decompressed and then absorbs heat in the heat absorber.

* * * * *